(12) United States Patent
Zeng et al.

(10) Patent No.: US 8,965,128 B2
(45) Date of Patent: Feb. 24, 2015

(54) CODE RECOGNITION METHOD, DEVICE AND COMPUTER READABLE STORAGE MEDIUM FOR STORING CODE RECOGNITION METHOD

(75) Inventors: Yi-Chong Zeng, Keelung (TW); Jing-Fung Chen, Zhonghe (TW)

(73) Assignee: Institute for Information Industry, Taipei (TW)

( * ) Notice: Subject to any disclaimer, the term of this patent is extended or adjusted under 35 U.S.C. 154(b) by 217 days.

(21) Appl. No.: 12/971,176

(22) Filed: Dec. 17, 2010

(65) Prior Publication Data
US 2012/0141030 A1   Jun. 7, 2012

(30) Foreign Application Priority Data
Dec. 1, 2010   (TW) ................................ 99141804 A

(51) Int. Cl.
   *G06K 9/18*   (2006.01)
   *G06K 9/46*   (2006.01)
   *G06K 9/00*   (2006.01)
(52) U.S. Cl.
   CPC .......... *G06K 9/4642* (2013.01); *G06K 9/00422* (2013.01)
   USPC ....................................................... 382/182
(58) Field of Classification Search
   None
   See application file for complete search history.

(56) References Cited

U.S. PATENT DOCUMENTS

| 4,259,661 | A | * | 3/1981 | Todd ............................ 382/205 |
| 4,499,499 | A | * | 2/1985 | Brickman et al. ............. 382/181 |
| 4,654,873 | A | * | 3/1987 | Fujisawa et al. .............. 382/178 |
| 4,850,025 | A | * | 7/1989 | Abe ............................... 382/220 |
| 5,020,117 | A | * | 5/1991 | Ooi et al. ....................... 382/185 |
| 5,321,768 | A | * | 6/1994 | Fenrich et al. ................. 382/178 |
| 5,497,432 | A | * | 3/1996 | Nishida .......................... 382/178 |

(Continued)

FOREIGN PATENT DOCUMENTS

| EP | 1085456 | 3/2001 |
| GB | 2392290 A | 2/2004 |

(Continued)

OTHER PUBLICATIONS

English translation of abstract of EP 1085456 (published Mar. 21, 2001).

(Continued)

*Primary Examiner* — Shefali Goradia
*Assistant Examiner* — Jonathan S Lee
(74) *Attorney, Agent, or Firm* — McClure, Qualey & Rodack, LLP

(57) ABSTRACT

A code recognition method includes the following steps: a first code-image block is received. Wherein, several first codes are displayed on the first code-image block. The first code-image block is partitioned into several second code-image blocks. Wherein, each of the second code-image blocks displays a second code respectively. Each of the second codes is one of the first codes. Each of the second code-image blocks is recognized as several third codes corresponding to each of the second codes respectively. Some of the neighboring second code-image blocks are combined to form several third code-image blocks. Wherein, each of the third code-image blocks displays a first code set, which comprises some of the second codes. Each of the third code-image blocks is recognized as a second code set corresponding to each of the first code sets respectively. Wherein, each of the second code sets includes the codes selected from the third codes.

13 Claims, 3 Drawing Sheets

(56) References Cited

U.S. PATENT DOCUMENTS

| | | | |
|---|---|---|---|
| 5,644,656 A * | 7/1997 | Akra et al. | 382/215 |
| 5,787,194 A * | 7/1998 | Yair | 382/173 |
| 5,862,259 A * | 1/1999 | Bokser et al. | 382/228 |
| 5,903,666 A | 5/1999 | Guzik et al. | |
| 5,966,464 A * | 10/1999 | Kojima | 382/228 |
| 6,014,460 A * | 1/2000 | Fukushima et al. | 382/177 |
| 6,219,449 B1 * | 4/2001 | Nagaishi | 382/186 |
| 6,339,651 B1 * | 1/2002 | Tian et al. | 382/105 |
| 6,473,517 B1 * | 10/2002 | Tyan et al. | 382/105 |
| 6,947,596 B2 * | 9/2005 | Kashioka et al. | 382/186 |
| 7,136,526 B2 * | 11/2006 | Hotta et al. | 382/187 |
| 7,139,430 B2 * | 11/2006 | Sparr et al. | 382/186 |
| 2003/0044068 A1 * | 3/2003 | Kagehiro et al. | 382/182 |
| 2004/0037470 A1 * | 2/2004 | Simske | 382/229 |
| 2004/0141645 A1 * | 7/2004 | Lee et al. | 382/182 |
| 2004/0146216 A1 * | 7/2004 | Andel et al. | 382/277 |
| 2005/0175242 A1 * | 8/2005 | Tanaka | 382/187 |
| 2006/0039605 A1 * | 2/2006 | Koga | 382/182 |
| 2006/0062466 A1 * | 3/2006 | Zou et al. | 382/186 |
| 2006/0215937 A1 * | 9/2006 | Snapp | 382/311 |
| 2008/0278481 A1 | 11/2008 | Aguera y Arcas et al. | |
| 2009/0226089 A1 * | 9/2009 | Ozawa et al. | 382/185 |

FOREIGN PATENT DOCUMENTS

| | | |
|---|---|---|
| JP | 02083688 A * | 3/1990 |
| TW | 376492 | 12/1999 |
| TW | 200847035 A | 12/2008 |

OTHER PUBLICATIONS

English translation of abstract of TW 376492 (published Dec. 11, 1999).

English translation of abstract of TW 200847035 A (published Dec. 1, 2008).

* cited by examiner

CODE RECOGNITION METHOD, DEVICE AND COMPUTER READABLE STORAGE MEDIUM FOR STORING CODE RECOGNITION METHOD

RELATED APPLICATIONS

This application claims priority to Taiwan Application Serial Number 099141804, filed Dec. 1, 2010, which is herein incorporated by reference.

BACKGROUND

1. Technical Field

The present invention relates to a code recognition method, device and a computer readable storage medium for storing thereof.

2. Description of Related Art

Daily applications require users to type words on pictures or magazines into computer systems. Also, if a user wishes to amend the contents of the DM or contract, they need to retype the words. In the prior art, code recognition software converts the words on pictures into computer readable codes.

Common code recognition software partitions the image for recognition into several single-code-image blocks and then endeavors to recognize the code on each block. However, if the image is not partitioned correctly, code recognition success rates may be reduced.

SUMMARY

According to one embodiment of this invention, a code recognition method is provided. In the code recognition method, a code image is partitioned into several code-image blocks to be recognized as the candidate codes on each of the code-image blocks. Then, some of the neighboring code-image blocks are combined to form other code-image blocks, and the combined code-image blocks are recognized as codes, which are selected from a combination of the candidate codes. The code recognition method may take the form of a computer program product stored on a computer-readable storage medium having computer-readable instructions embodied in the medium. The code recognition method includes the following steps: a first code-image block is received. Wherein, several first codes are displayed on the first code-image block. The first code-image block is partitioned into several second code-image blocks. Wherein, each of the second code-image blocks displays a second code respectively. Each of the second codes is one of the first codes. Each of the second code-image blocks is recognized as several third codes corresponding to each of the second codes respectively. Some of the neighboring second code-image blocks are combined to form several third code-image blocks. Wherein, each of the third code-image blocks displays a first code set, which includes some of the second codes. Each of the third code-image blocks is recognized as a second code set corresponding to each of the first code sets respectively. Wherein, each of the second code sets includes the codes selected from the third codes.

According to another embodiment of this invention, a code recognition device is provided. The code recognition device partitions a code image into several code-image blocks to be recognized as the candidate codes on each of code-image blocks. Then, some of the neighboring code-image blocks are combined to form other code-image blocks, and the combined code-image blocks are recognized as codes, which are selected from a combination of the candidate codes. A processing unit of the code recognition device includes a code-image block receiving module, a partitioning module, a code recognition module, a combining module and a code-set recognition module. The code-image block receiving module receives a first code-image block. Wherein, several first codes are displayed on the first code-image block. The partitioning module partitions the first code-image block into several second code-image blocks. Wherein, each of the second code-image blocks displays a second code respectively. Each of the second codes is one of the first codes. The code recognition module recognizes each of the second code-image blocks as several third codes corresponding to each of the second codes respectively. The combining module combines some of the neighboring second code-image blocks to form several third code-image blocks. Wherein, each of the third code-image blocks displays a first code set, which includes some of the second codes. The code-set recognition module recognizes each of the third code-image blocks as a second code set corresponding to each of the first code sets respectively. Wherein, each of the second code sets includes the codes selected from the third codes.

Above all, since the recognized second code set is a combination formed by the codes recognized from the single-code image, which can increase the recognition success rates. Besides, code recognition failure caused by the fault partition can be avoided.

These and other features, aspects, and advantages of the present invention will become better understood with reference to the following description and appended claims. It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
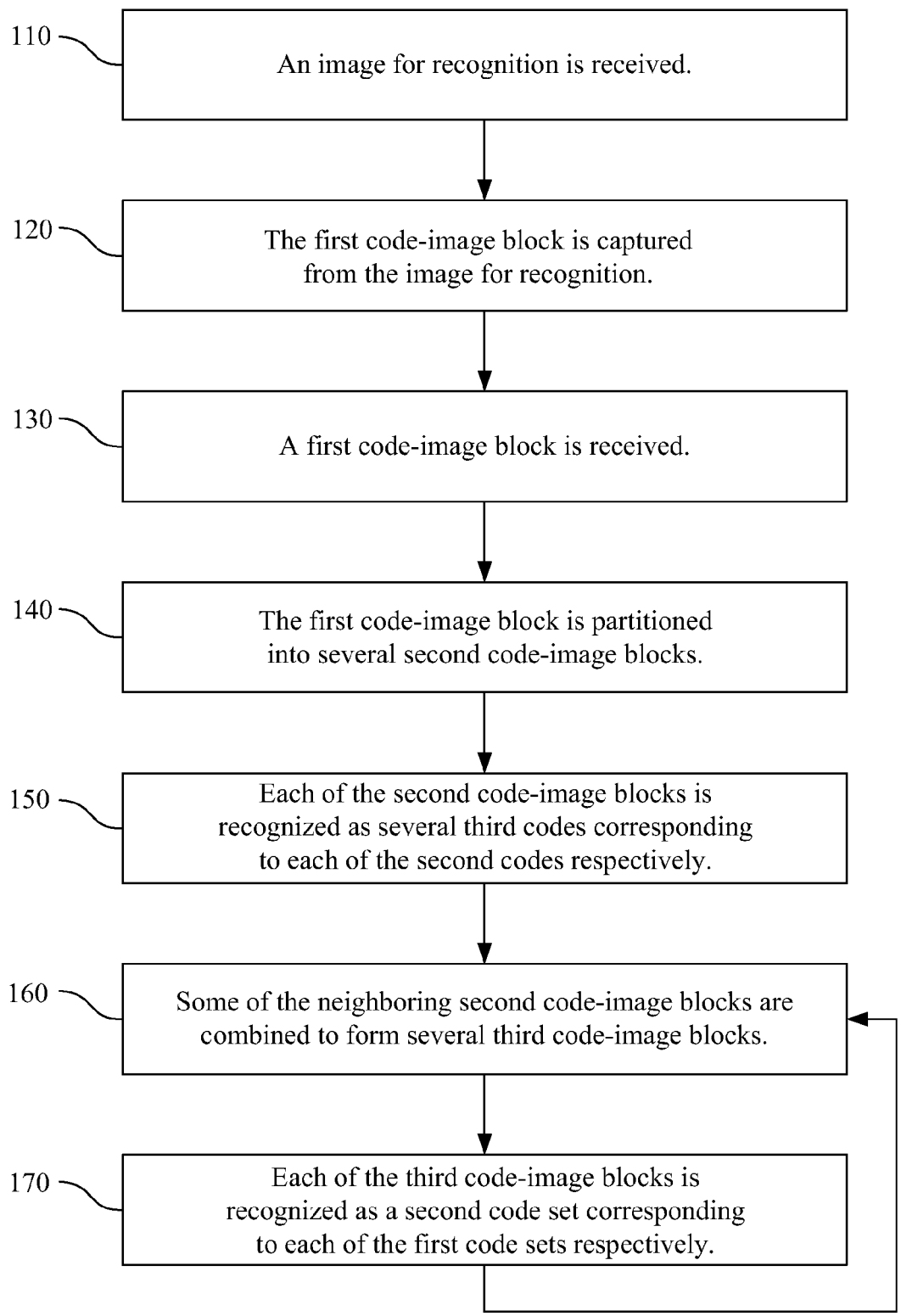
FIG. 1 is a flow diagram of a code recognition method according to one embodiment of this invention.

Reference will now be made in detail to the present embodiments of the invention, examples of which are illustrated in the accompanying drawings. Wherever possible, the same reference numbers are used in the drawings and the description to refer to the same or like parts.

Figure 2A:
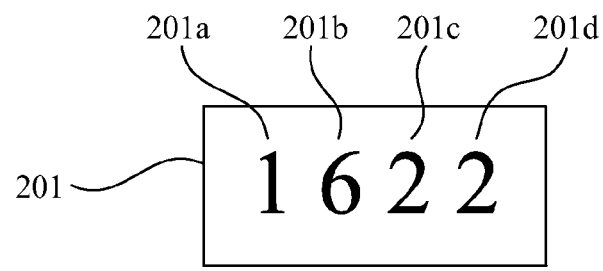
FIGS. 2A-2C shows an embodiment of code recognition.
Figure 2B:
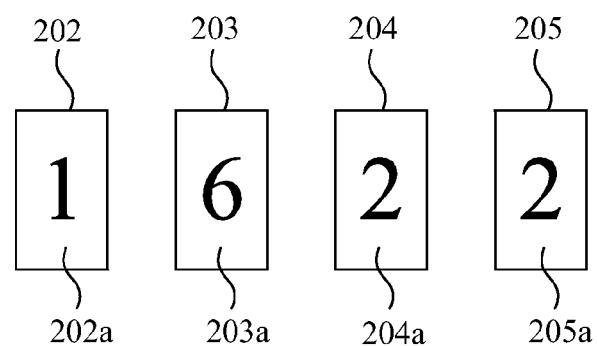
Figure 2C:
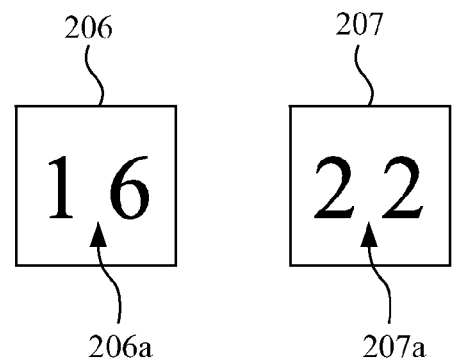

FIG. 1 is a flow diagram of a code recognition method according to one embodiment of this invention. FIGS. 2A-2C show an embodiment of code recognition. In the code recognition method, a code image is partitioned into several code-image blocks to be recognized as the candidate codes on each of code-image blocks. Then, some of the neighboring code-image blocks are combined to form other code-image blocks, and the combined code-image blocks are recognized as codes, which are selected from a combination of the candidate codes. The code recognition method may take the form of a computer program product stored on a computer-readable storage medium having computer-readable instructions embodied in the medium. Any suitable storage medium may be used including non-volatile memory such as read only memory (ROM), programmable read only memory (PROM), erasable programmable read only memory (EPROM), and electrically erasable programmable read only memory (EEPROM) devices; volatile memory such as SRAM, DRAM, and DDR-RAM; optical storage devices such as CD-ROMs and DVD-ROMs; and magnetic storage devices such as hard disk drives and floppy disk drives.

The code recognition method 100 includes the following steps:

Refer to both FIG. 1 and FIG. 2A. In step 130, a first code-image block 201 is received. Wherein, several first codes 201a, 201b, 201c, 201d are displayed on the first code-image block 201. Before step 130, an image for recognition may be received (step 110), and the first code-image block may be captured from the image for recognition (step 120) for receiving in step 130. Therefore, code recognition may not be affected by non-code blocks, which can increase recognition success rates.

When capturing the first code-image block 201 (step 120), the captured first code-image block 201 can be normalized. Wherein, Affine Mapping algorithm, Scale-Invariant Feature Transform (SIFT) algorithm, Speeded Up Robust Features (SURF) algorithm or any other image normalizing algorithm can be utilized to normalize the captured first code-image block 201. Therefore, after being normalized, recognition success rates can be raised.

Refer to FIG. 1, FIG. 2A and FIG. 2B. In step 140, the first code-image block 201 is partitioned into several second code-image blocks 202, 203, 204, 205. Wherein, each of the second code-image blocks 202, 203, 204, 205 displays a second code 202a, 203a, 204a, 205a respectively. Each of the second codes 202a, 203a, 204a, 205a is one of the first codes 201a, 201b, 201c, 201d.

In step 150, each of the second code-image blocks 202, 203, 204, 205 is recognized as several third codes corresponding to each of the second codes 202a, 203a, 204a, 205a respectively. For example, step 150 may recognize the second code 202a on the second code-image block 202 as "1" or "7"; step 150 may recognize the second code 203a on the second code-image block 203 as "6" or "8"; step 150 may recognize both the second codes 204a, 205a on the second code-image blocks 204, 205 as "2" or "3". Hence, "1" and "7" are taken as the third codes corresponding to the second codes 202a; "6" and "8" are taken as the third codes corresponding to the second codes 203a; "2" and "3" are taken as the third codes corresponding to the second codes 204a; "1" and "7" are taken as the third codes corresponding to the second codes 205a.

Refer to FIG. 1, FIG. 2B and FIG. 2C. In step 160, some of the neighboring second code-image blocks 202, 203, 204, 205 are combined to form several third code-image blocks 206, 207. Wherein, the third code-image block 206 displays a first code set 206a, which includes the combination of the second codes 202a and 203a; the third code-image block 207 displays a first code set 207a, which includes the combination of the second codes 204a and 205a. In other embodiments, at least three of the second code-image blocks can be combined to form a third code-image block, which should not be limited in this disclosure.

In step 170, each of the third code-image blocks 206, 207 respectively is recognized as a second code set corresponding to each of the first code sets 206a, 207a respectively. Wherein, each of the second code sets includes the codes selected from the third codes. For example, step 170 may select the third codes corresponding to the second codes 202a, 203a to form "1 6", "1 8", "7 6", "7 8", which are possible candidates for the second code set corresponding to the first code set 206a; step 170 may select the third codes corresponding to the second codes 204a, 205a to form "2 2", "2 3", "3 2", "3 3", which are possible candidates for the second code set corresponding to the first code set 207a. Since the second code set is a combination formed by the codes recognized from the single-code image, which can increase the recognition success rates. Also, code recognition failure caused by the fault partition in step 140 can be avoided.

In one embodiment of this invention, the neighboring code-image blocks 206, 207 can be combined for further code recognition. Therefore, further combination for code recognition may increase recognition success rates. In another embodiment of this invention, the recognized can be output directly.

Refer to both FIG. 1 and FIG. 2B. In one embodiment of this invention, the step of recognizing several third codes corresponding to each of the second codes 202a, 203a, 204a, 205a from each of the second code-image blocks 202, 203, 204, 205 respectively (step 150) may further include the following steps: each of the second code-image blocks 202, 203, 204, 205 may be compared with several code images of several candidate codes stored in a code-image database to obtain the third codes corresponding to each of the second codes 202a, 203a, 204a, 205a selected from the candidate codes. Wherein, code-image differences between each of the second code-image blocks 202, 203, 204, 205 and the code images of the candidate codes can be calculated. Hence, the third codes corresponding to each of the second codes can be obtained according to the code-image differences. The code-image differences can be calculated utilizing a non-linear difference calculating algorithm such as Least Mean Square (LMS) algorithm, Quadratic Programming algorithm or any other non-linear difference calculating algorithm. Also, the code type of the second code-image blocks 202, 203, 204, 205 can be specified in advance to increase code recognition speed and reduce comparison number for code recognition. For example, the second code-image blocks 202, 203, 204, 205 may be specified as number. Then, the second code-image blocks 202, 203, 204, 205 can be compared with the code images of the numbers for recognition in step 150.

Refer to both FIG. 1 and FIG. 2C. In one embodiment of this invention, recognizing a second code set corresponding to each of the first code sets 206a, 207a from each of the third code-image blocks 206, 207 respectively (step 170) may include the following steps: each of the third code-image blocks 206, 207 is compared with the code images corresponding to the third codes stored in a code-image database to obtain the second code sets, which includes the codes selected from the third codes, corresponding to the first code sets. Wherein, code-set-image differences between each of the third code-image blocks 206, 207 and the code images corresponding to the third codes can be calculated for selecting second code sets. For example, the code-set-image differences between the code-image block 206 and the code sets "1 6", "1 8", "7 6", "7 8", which are combined by the third codes, are calculated respectively, and the code set with the minimal code-set-image difference is taken as the second code set corresponding to the first code set 206a; the code-set-image differences between the code-image block 207 and the code sets "2 2", "2 3", "3 2", "3 3", which are combined by the third codes, are calculated respectively, and the code set with the minimal code-set-image difference is taken as the second code set corresponding to the first code set 207a.

Figure 3:
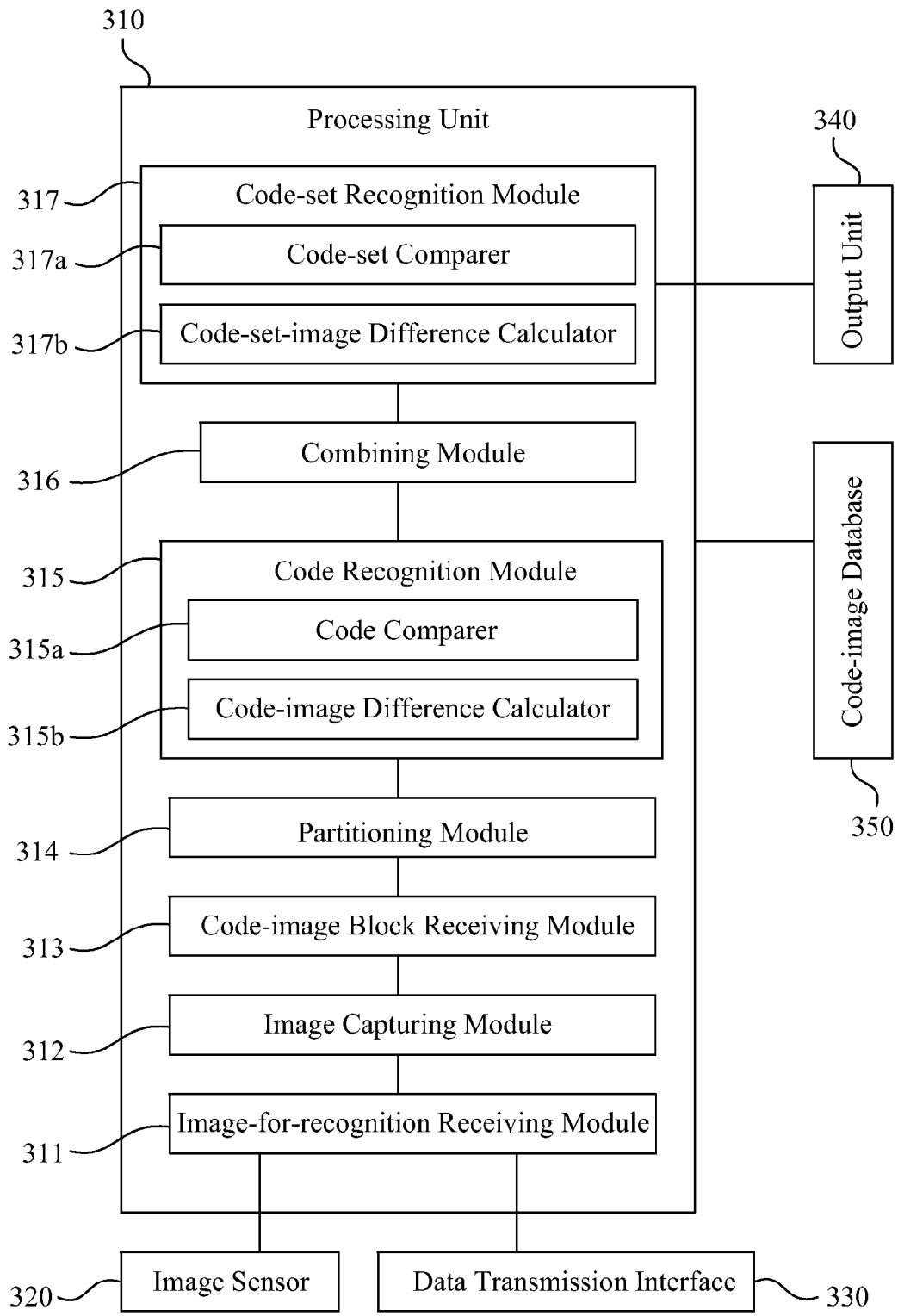
FIG. 3 illustrates a block diagram of a code recognition device according to another embodiment of this invention.

FIG. 3 illustrates a block diagram of a code recognition device according to another embodiment of this invention. The code recognition device partitions a code image into several code-image blocks to be recognized as the candidate codes on each of code-image blocks. Then, some of the neighboring code-image blocks are combined to form other code-image blocks, and the combined code-image blocks are recognized as codes, which are selected from combination of the candidate codes.

A processing unit 310 of the code recognition device 300 includes a code-image block receiving module 313, a partitioning module 314, a code recognition module 315, a combining module 316 and a code-set recognition module 317.

Refer to both FIG. 2A and FIG. 3. The code-image block receiving module 313 receives a first code-image block 201. Wherein, several first codes 201a, 201b, 201c, 201d are displayed on the first code-image block 201. Besides, the processing unit 310 may include an image-for-recognition receiving module 311 and an image capturing module 312. The image-for-recognition receiving module 311 receives an image for recognition. In one embodiment of this invention, the code recognition device 300 may further include an image sensor 320, which is electrically connected to the processing unit 310. Hence, the image sensor 320 may sense the image for recognition for the image-for-recognition receiving module 311 to receive. In another embodiment of this invention, the code recognition device 300 may further include a data transmission interface 330, which is electrically connected to the processing unit 310. Hence, the image-for-recognition receiving module 311 may receive the image for recognition through the data transmission interface 330.

The image capturing module 312 captures the first code-image block 201 from the image for recognition. Therefore, code recognition may not be affected by non-code blocks, which can increase recognition success rates.

Besides, the image capturing module 312 may normalize the captured first code-image block 201. Wherein, Affine Mapping algorithm, Scale-Invariant Feature Transform (SIFT) algorithm, Speeded Up Robust Features (SURF) algorithm or any other image normalizing algorithm can be utilized to normalize the captured first code-image block 201. Therefore, after being normalized, recognition success rates can be raised.

Refer to FIG. 2A, FIG. 2B and FIG. 3. The partitioning module 314 partitions the first code-image block 201 into several second code-image blocks 202, 203, 204, 205. Wherein, each of the second code-image blocks 202, 203, 204, 205 displays a second code 202a, 203a, 204a, 205a respectively. Each of the second codes 202a, 203a, 204a, 205a is one of the first codes 201a, 201b, 201c, 201d.

The code recognition module 315 recognizes each of the second code-image blocks 202, 203, 204, 205 as several third codes corresponding to each of the second codes 202a, 203a, 204a, 205a respectively. For example, the code recognition module 315 may recognize the second code 202a on the second code-image block 202 as "1" or "7"; the code recognition module 315 may recognize the second code 203a on the second code-image block 203 as "6" or "8"; the code recognition module 315 may recognize both the second codes 204a, 205a on the second code-image blocks 204, 205 as "2" or "3". Hence, "1" and "7" are taken as the third codes corresponding to the second codes 202a; "6" and "8" are taken as the third codes corresponding to the second codes 203a; "2" and "3" are taken as the third codes corresponding to the second codes 204a; "1" and "7" are taken as the third codes corresponding to the second codes 205a.

Refer to FIG. 2B, FIG. 2C and FIG. 3. The combining module 316 combines some of the neighboring second code-image blocks 202, 203, 204, 205 to form several third code-image blocks 206, 207. Wherein, the third code-image block 206 displays a first code set 206a, which includes the combination of the second codes 202a and 203a; the third code-image block 207 displays a first code set 207a, which includes the combination of the second codes 204a and 205a. In other embodiment, at least three of the second code-image blocks can be combined to form a third code-image block, which should not be limited in this disclosure.

The code-set recognition module 317 recognizes each of the third code-image blocks 206, 207 as a second code set corresponding to each of the first code sets 206a, 207a respectively. Wherein, each of the second code sets includes the codes selected from the third codes. For example, the code-set recognition module 317 may select the third codes corresponding to the second codes 202a, 203a to form "1 6", "1 8", "7 6", "7 8", which are possible candidates for the second code set corresponding to the first code set 206a; the code-set recognition module 317 may select the third codes corresponding to the second codes 204a, 205a to form "2 2", "2 3", "3 2", "3 3", which are possible candidates for the second code set corresponding to the first code set 207a. Since the second code set is a combination formed by the codes recognized from the single-code image, which can increase the recognition success rates. Besides, code recognition failure caused by the partitioning module 314 can be avoided.

In one embodiment of this invention, the combining module 316 may combine the neighboring code-image blocks 206, 207 for further code recognition. Therefore, further combination for code recognition may increase recognition success rates. In another embodiment of this invention, an output unit 340, which is electrically connected to the processing unit, can output the recognized second code set directly.

Refer to both FIG. 2B and FIG. 3. In one embodiment of this invention, the code recognition module 315 may recognize code through image comparison. Hence, the code recognition device 300 may further include a code-image database 350, which is electrically connected to the processing unit 310. The code-image database 350 stores several code images of several candidate codes. The code recognition module 315 may include a code comparer 315a. The code comparer 315a may compare each of the second code-image blocks 202, 203, 204, 205 with several code images of several candidate codes stored in the code-image database 350 to obtain the third codes corresponding to each of the second codes 202a, 203a, 204a, 205a selected from the candidate codes. Wherein, the code comparer 315a may utilize difference between images for code recognition. Hence, the code comparer 315a may further include a code-image difference calculator 315b. The code-image difference calculator 315b calculates code-image differences between each of the second code-image blocks 202, 203, 204, 205 and the code images of the candidate codes. The code-image difference calculator 315b may calculate the code-image differences utilizing a non-linear difference calculating algorithm such as Least Mean Square (LMS) algorithm, Quadratic Programming algorithm or any other non-linear difference calculating algorithm. Besides, the code recognition module 315 may specify the code type of the second code-image blocks 202, 203, 204, 205 in advance to increase code recognition speed and reduce comparison number for code recognition. For example, the code recognition module 315 may specify the second code-image blocks 202, 203, 204, 205 as number. Then, the code recognition module 315 may compare the second code-image blocks 202, 203, 204, 205 with the code images of the numbers for recognition in step 150.

Refer to both FIG. 2C and FIG. 3. In one embodiment of this invention, the code-set recognition module 317 may recognize the code set by comparing images. Therefore, the code-set recognition module 317 may include a code-set comparer 317a. The code-set recognition module 317 may compare each of the third code-image blocks 206, 207 with the code images corresponding to the third codes stored in the code-image database 350 to obtain the second code sets, which includes the codes selected from the third codes, corresponding to the first code sets. Wherein, the code-set comparer 317a may utilize difference between images for code set recognition. Hence, the code-set recognition module 317 may further include a code-set-image difference calculator 317b. The code-set-image difference calculator 317b calculates code-set-image differences between each of the third code-image blocks 206, 207 and the code images corresponding to the third codes for selecting second code sets. For example, the code-set-image difference calculator 317b calculates the code-set-image differences between the code-image block 206 and the code sets "1 6", "1 8", "7 6", "7 8", which are combined by the third codes, respectively, and the code set with the minimal code-set-image difference is taken as the second code set corresponding to the first code set 206a; the code-set-image difference calculator 317b calculates the code-set-image differences between the code-image block 207 and the code sets "2 2", "2 3", "3 2", "3 3", which are combined by the third codes, respectively, and the code set with the minimal code-set-image difference is taken as the second code set corresponding to the first code set 207a Above all, since the recognized second code set is a combination formed by the codes recognized from the single-code image, which can increase the recognition success rates. Besides, code recognition failure caused by the fault partition can be avoided.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A code recognition method comprising:
   receiving a first code-image block, wherein a plurality of first displayed codes are displayed on the first code-image block;
   partitioning the first code-image block into a plurality of second code-image blocks, wherein each of the second code-image blocks displays a second displayed code respectively, each of the second displayed codes displayed in each second code-image block is one of the first displayed codes;
   recognizing each of the second code-image blocks as a plurality of third recognized codes corresponding to each of the second displayed codes respectively;
   forming a plurality of possible candidates based on the third recognized codes corresponding to adjacent ones of the second displayed codes, wherein each of the possible candidates comprises at least two of the third recognized codes;
   combining some of the neighboring second code-image blocks to form a plurality of third code-image blocks, wherein each of the third code-image blocks displays a first displayed code set, which comprises some of the second displayed codes; and
   calculating a code-set-image differences between one of the third code-image blocks and each of the possible candidates, and selecting one of the possible candidates according to the code-set-image differences, without considering a grammatical meaning of each of the possible candidates, as a second recognized code set corresponding to the first displayed code set in the one of the third code-image blocks;
   wherein the step of recognizing each of the second code-image blocks as the third recognized codes corresponding to each of the second displayed codes respectively comprises:
   comparing each of the second code-image blocks with multiple code images of multiple candidate codes stored in a code-image database to obtain the third recognized codes corresponding to each of the second displayed codes selected from the candidate codes.

2. The code recognition method of claim 1, wherein the step of comparing each of the second code-image blocks with the code images of the candidate codes stored in the code-image database comprises:
   calculating a plurality of code-image differences between each of the second code-image blocks and the code images of the candidate codes,
   wherein the third recognized codes corresponding to each of the second displayed codes are obtained according to the code-image differences.

3. The code recognition method of claim 2, wherein the code-image differences are calculated utilizing a non-linear difference calculating algorithm.

4. The code recognition method of claim 1 further comprising:
   receiving an image for recognition; and
   capturing the first code-image block from the image for recognition.

5. The code recognition method of claim 1 further comprising:
   receiving an image for recognition;
   capturing the first code-image block from the image for recognition; and
   normalizing the captured first code-image block.

6. The code recognition method of claim 5, wherein the first code-image block is normalized utilizing an affine mapping model, Scale-invariant feature transform (SIFT) or Speeded Up Robust Features (SURF).

7. A non-transitory computer readable storage medium with a computer program to execute a code recognition method, wherein the code recognition method comprises:
   receiving a first code-image block, wherein a plurality of first displayed codes are displayed on the first code-image block;
   partitioning the first code-image block into a plurality of second code-image blocks, wherein each of the second code-image blocks displays a second displayed code respectively, each of the second displayed codes displayed in each second code-image block is one of the first displayed codes;
   recognizing each of the second code-image blocks as a plurality of third recognized codes corresponding to each of the second displayed codes respectively;
   forming a plurality of possible candidates based on the third recognized codes corresponding to adjacent ones of the second displayed codes, wherein each of the possible candidates comprises at least two of the third recognized codes;
   combining some of the neighboring second code-image blocks to form a plurality of third code-image blocks, wherein each of the third code-image blocks displays a first displayed code set, which comprises some of the second displayed codes; and calculating a code-set-image differences between one of the third code-image blocks and each of the possible candidates, and selecting one of the possible candidates according to the code-set-image differences, without considering a grammatical meaning of each of the possible candidates, as a second recognized code set corresponding to the first displayed code set in the one of the third code-image blocks;

wherein the step of recognizing each of the second code-image blocks as the third recognized codes corresponding to each of the second displayed codes respectively comprises:

comparing each of the second code-image blocks with multiple code images of multiple candidate codes stored in a code-image database to obtain the third recognized codes corresponding to each of the second displayed codes selected from the candidate codes.

8. A code recognition device comprising:

a processing unit configured to receive a first code-image block, wherein a plurality of first displayed codes are displayed on the first code-image block, partition the first code-image block into a plurality of second code-image blocks, wherein each of the second code-image blocks displays a second displayed code respectively, each of the second displayed codes displayed in each second code-image block is one of the first displayed codes, recognize each of the second code-image blocks as a plurality of third recognized codes corresponding to each of the second displayed codes respectively, form a plurality of possible candidates based on the third recognized codes corresponding to adjacent ones of the second displayed codes, wherein each of the possible candidates comprises at least two of the third recognized codes, combine some of the neighboring second code-image blocks to form a plurality of third code-image blocks, wherein each of the third code-image blocks displays a first displayed code set, which comprises some of the second displayed codes, and calculate a code-set-image differences between one of the third code-image blocks and each of the possible candidates, and select one of the possible candidates according to the code-set-image differences, without considering a grammatical meaning of each of the possible candidates, as a second recognized code set corresponding to the first displayed code set in the one of the third code-image blocks;

a code-image database electrically connected to the processing unit, the code-image database storing multiple code images of multiple candidate codes, wherein the processing unit is further configured to compare each of the second code-image blocks with the code images of the candidate codes stored in the code-image database to obtain the third recognized codes corresponding to each of the second displayed codes selected from the candidate codes; and an output unit electrically connected to the processing unit, configured to output one of the second code sets.

9. The code recognition device of claim 8, wherein the processing unit is further configured to calculate a plurality of code-image differences between each of the second code-image blocks and the code images of the candidate codes, wherein the processing unit obtains the third recognized codes are corresponding to each of the second displayed codes according to the code-image differences.

10. The code recognition device of claim 8, wherein the processing unit is further configured to compare each of the third code-image blocks with the code images corresponding to the third recognized codes stored in the code-image database to obtain the second recognized code sets, which comprises the codes selected from the third recognized codes, corresponding to the first displayed code sets.

11. The code recognition device of claim 8, wherein the processing unit is further configured to receive an image for recognition, and capture the first code-image block from the image.

12. The code recognition device of claim 11 further comprising:

an image sensor, which is electrically connected to the processing unit, for sensing the image.

13. The code recognition device of claim 11 further comprising:

a data transmission interface, which is electrically connected to the processing unit, wherein the image for recognition is received through the data transmission interface.

* * * * *